March 27, 1934.  R. G. AURIEN  1,952,649
UNIT CYLINDER CLASP BRAKE
Filed March 26, 1931  2 Sheets-Sheet 1
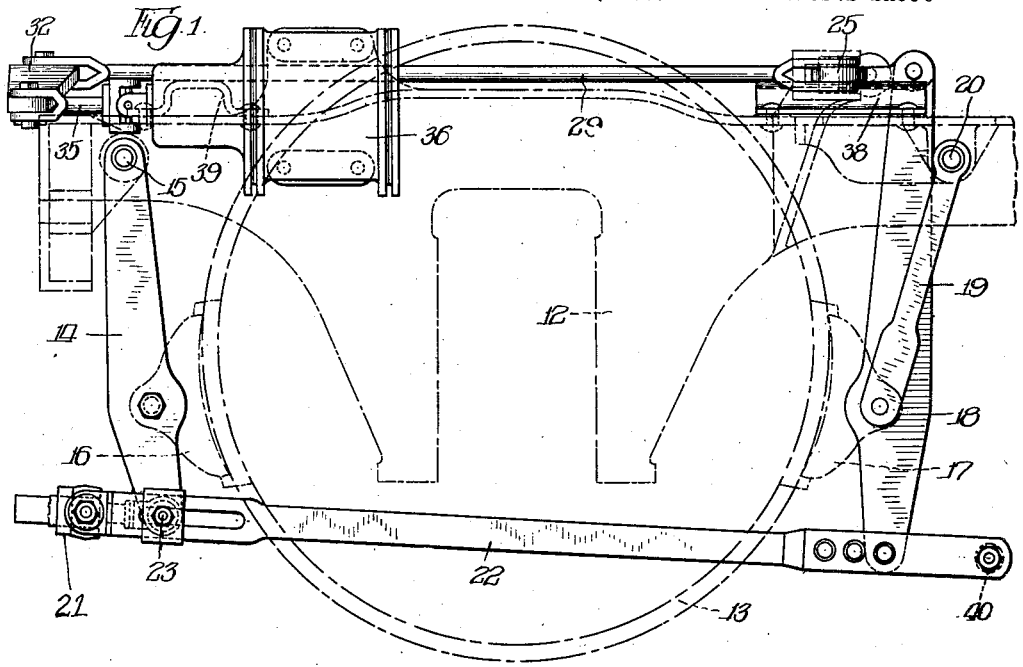
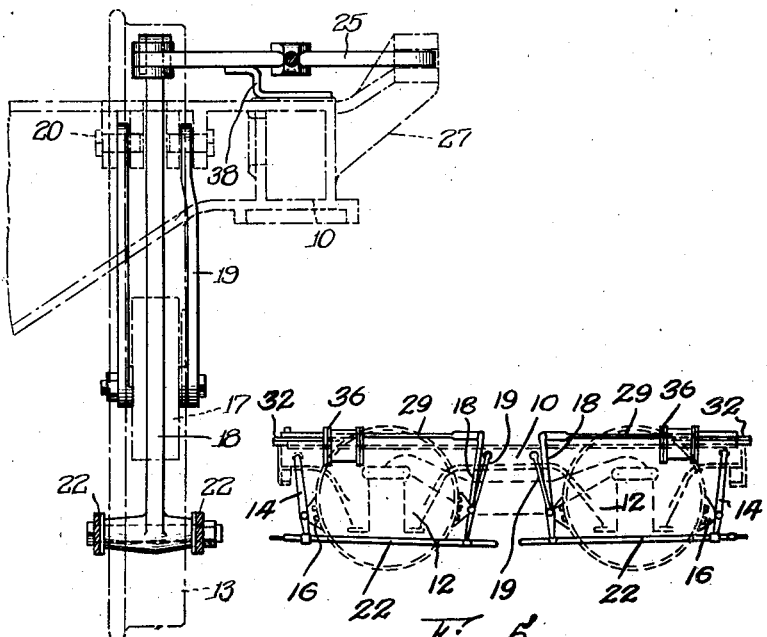
Inventor:
Ray G. Aurien,
By Wilkinson, Huxley, Byron & Knight
Attys.

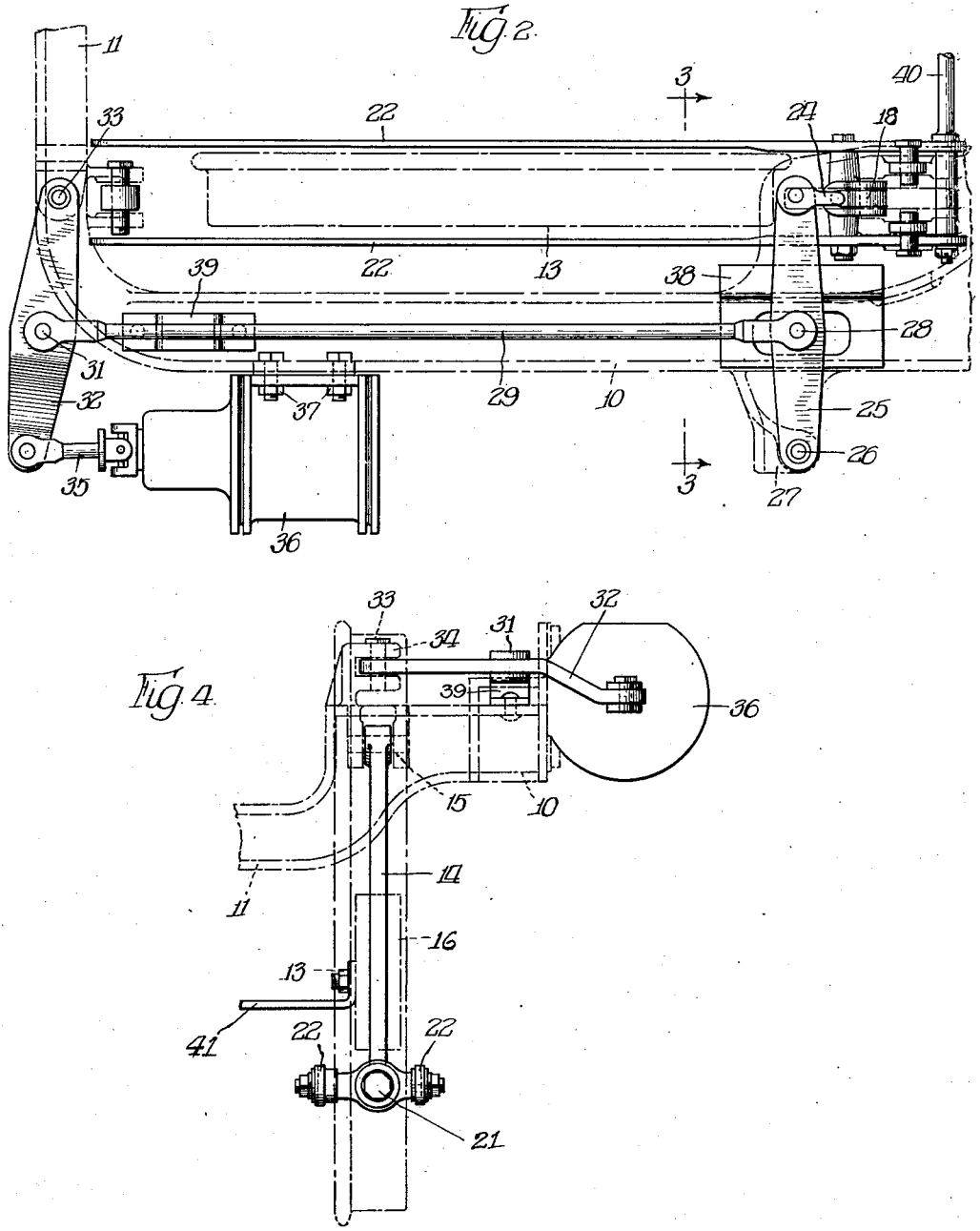

Patented Mar. 27, 1934

1,952,649

UNITED STATES PATENT OFFICE 1,952,649

UNIT CYLINDER CLASP BRAKE

Ray G. Aurien, Chicago, Ill., assignor to American Steel Foundries, Chicago, Ill., a corporation of New Jersey Application March 26, 1931, Serial No. 525,367

50 Claims. (Cl. 188—56)

The invention relates to brake rigging and has particular reference to a unit cylinder clasp brake arrangement for railway motor trucks.

An object of the invention is to provide a type of brake rigging adapted for successfully meeting service conditions prevailing in railway motor trucks.

Another object of the invention is to provide brake rigging of the type wherein brake shoes are applied to both sides of the car wheel, each set being operated by a power cylinder located on the frame adjacent thereto and wherein the power cylinder and other operating mechanism will be kept close to the frame, taking up as little room as possible.

A yet further object is to provide a brake rigging of simple construction, which will be light in weight and effective and positive in operation.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary elevational view of a portion of the truck frame and associated brake mechanism, constructed in accordance with the present invention;

Figure 2 is a plan view of the same;

Figure 3 is a sectional view taken along the plane indicated by line 3—3 of Figure 2; and Figure 4 is an end elevation of the arrangement shown in Figure 2.

Figure 5 is a side elevation more or less diagrammatically showing the brake arrangement applied to the wheels of a four-wheel truck.

Inasmuch as the brake arrangement of the present invention is duplicated for each wheel of the railway car truck as indicated diagrammatically in Figure 5, only one set is disclosed and described herein specifically with the belief that this will make for a simplified explanation and a better understanding of the invention.

Referring to the drawings, particularly Figures 1 and 2, the construction is shown as comprising a truck frame 10, having center members, not shown, and end members 11 integral therewith and also being provided with journal box supporting and guiding pedestals 12 provided on the side frame of said truck frame for receiving in the usual manner journal boxes which support the wheels and axles represented diagrammatically at 13.

The brake rigging proper comprises a dead truck lever 14 pivoted at its upper end to the truck frame as at 15 and having pivotally connected intermediate its end the outside brake head 16. The inside brake head 17 located on the opposite side of the wheel is pivotally connected intermediately to the live truck lever 18, the same being pivotally supported from frame 10 by means of hangers 19, which hangers have pivotal connection to the frame by means of pins 20. The live truck lever is thus pivotally connected to the brake head 17 and to the hangers 19, which serve to pivotally support the same from the frame. At the lower end of truck lever 14 and truck lever 18 are pivotally secured the tie rods 22 located on both sides of the wheel and which have operatively secured to them at the pivotal connection 23 a slack adjuster 21, by adjustment of which the spacing of the lower end of the live and dead truck lever can be varied so that in operation the slack which develops from the wear on the brake shoes can be taken up, as is well known in the railway brake rigging.

Secured to the upper end of truck lever 18 by means of the clevis connection 24 is a fulcrum lever 25, the same being pivotally connected at its outer end at 26 to bracket 27, suitably secured or formed integrally with the truck frame 10. Pivotally secured at substantially the mid-portion of the fulcrum lever 25, as at 28, is a pull rod 29, which is in a similar manner pivotally secured at its opposite end as at 31 to a cylinder lever 32, the lever being in turn pivoted to the frame at 33 through means of a suitable bracket 34. To the outer end of the cylinder lever 32 is pivoted a link 35 which has suitable connection to the operating piston of a power cylinder 36, the same being suitably secured to the frame 10 by means of bolts 37. As a means for supporting the fulcrum lever 25 in spaced relation to the upper surface of the truck frame a bracket 38 is provided secured to the frame and adapted to engage the fulcrum lever at a point adjacent its pivotal connection to the pull rod. The pull rod is also similarly supported by means of the U-shaped bracket 39, suitably secured to the frame adjacent the power cylinder 36.

For maintaining the brake rigging rigid throughout its operative and inoperative positions, the live truck levers 18 on both sides of the frame are secured together by a connecting and spacing member 40 having connection to the end of the bars 22 adjacent the levers, which also serves to accurately space the brake heads 17 so as to keep the same in alignment with the tread on the car wheels. In a similar manner the tie bar 41 connects and properly spaces the brake heads 16. The clevis connection 24 not only serves to connect the fulcrum lever with the live truck lever, but, should the hangers 19 fail, the clevis will prevent the truck levers from falling upon the tracks.

In operation of the brake arrangement to apply the brake shoes associated with the respective brake heads 16 and 17 to the car wheel, air pressure is admitted to each of the cylinders 36 to force the cylinder piston outwardly in a direction towards the left, as viewed in Figure 2, and outwardly with respect to the end of the truck, as in Figure 5, to cause a pull upon the rod 39 in a direction towards the left, which is transmitted to the fulcrum lever 25, in turn causing actuation of the live truck lever 18 to apply the brake shoes associated therewith against the car wheel. The truck lever fulcrums about its pivot point connecting the same to the brake head, imparting to the connecting rods 22 a pull towards the right, thus actuating truck lever 14 in the proper direction to apply to the car wheel the brake shoes associated with the same. The release of the brakes is effected through springs located within the cylinder 36.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging, the combination with a truck frame, of live and dead truck levers pivotally supported from said frame, a fulcrum lever fulcrumed at its outer end to said frame, means connecting said lever to the live truck lever and to a pull rod respectively, and a lever pivoted to said truck frame and to said pull rod and operable to operate said brake rigging.

2. In a brake rigging, the combination with a truck frame, of live and dead truck levers pivotally supported from said frame, a fulcrum lever operatively connected to said live truck lever, said fulcrum lever having its fulcrum point located outwardly from the vertical plane of said truck frame, a pull rod connected to said fulcrum lever, and a lever pivoted to said truck frame and to said pull rod and operable to operate said brake rigging.

3. In a brake rigging, the combination with a truck frame, a dead truck lever at one side of a wheel and a live truck lever at the other side of the said wheel, of a fulcrum lever connected to said live truck lever and to the truck frame, a pull rod having pivotal connection at substantially the mid-portion of said fulcrum lever, and a lever pivoted to said truck frame and to said pull rod and operable to operate said brake rigging.

4. In a brake rigging, the combination with a truck frame, a dead truck lever at one side of a wheel and a live truck lever at the other side of the said wheel, a fulcrum lever having its inner end connected to said live truck lever and its outer end fulcrumed to the truck frame, a pull rod connected to the mid-portion of said fulcrum lever, and a power actuated lever having connection to the other end of said pull rod, and to said truck frame.

5. In a brake rigging, the combination with a truck frame, of a dead truck lever at one side of a wheel and a live truck lever at the other side of the said wheel, a pressure cylinder, a fulcrum lever connected to said live truck lever, a cylinder lever connected to the frame and at its opposite end to the piston of said pressure cylinder, and a pull rod connecting said fulcrum and cylinder levers.

6. In a brake rigging, the combination with a truck frame, of a dead truck lever at one side of a wheel and a live truck lever at the other side of the said wheel, a pressure cylinder, a fulcrum lever connected to said live truck lever, a cylinder lever connected to the frame and at its opposite end to the piston of said pressure cylinder, and a pull rod connected to the mid-portions of said fulcrum and cylinder levers respectively.

7. In a brake rigging, the combination with a truck frame, of a dead truck lever at one side of a wheel and a live truck lever at the other side of the wheel, a fulcrum lever connected to said live truck lever, the outer end of said fulcrum lever being connected to the frame, a cylinder lever pivoted at its inner end to the frame, and a pull rod connected to the mid-portions of said fulcrum and cylinder levers respectively.

8. In a brake rigging, the combination with a truck frame, of a dead truck lever at one side of a wheel and a live truck lever at the other side of the wheel, a fulcrum lever connected to said live truck lever, a bracket secured to the frame, the outer end of said fulcrum lever being pivoted to said bracket, a cylinder lever pivoted at its inner end to the frame, a power cylinder secured to said frame and associated with said lever, and a pull rod connecting said cylinder and fulcrum levers.

9. In a brake rigging, the combination with a truck frame, of a dead truck lever at one side of a wheel and a live truck lever at the other side of the wheel, a fulcrum lever connected to said live truck lever, a bracket secured to the frame, the outer end of said fulcrum lever being pivoted to said bracket, a cylinder lever pivoted at its inner end to the frame, a pull rod connecting said levers, and spacing members connected to the truck levers on opposite sides of the truck respectively.

10. In a brake rigging, the combination of a truck frame and a brake cylinder mounted thereon, a cylinder lever fulcrumed at one end on said truck frame and connected at the opposite end to the piston of said brake cylinder, a fulcrum lever fulcrumed at one end on said truck frame and connected at the opposite end to a truck lever, and a rod connecting said cylinder lever and said fulcrum lever.

11. In a brake rigging, the combination of a truck frame, live and dead truck levers operatively connected and supported from said frame, a bracket on said frame extending outwardly from the side thereof, a fulcrum lever fulcrumed to said bracket and connected to said live lever, and means connected to said fulcrum lever for actuating the same, said means including a dead lever and a pull rod connected to said dead lever and to said fulcrum lever.

12. In a clasp brake arrangement for a vehicle wheel, the combination of a vehicle frame disposed outwardly of said wheel, a cylinder mounted on said frame outwardly thereof, a dead truck lever disposed on one side of said wheel and in the plane thereof, a live truck lever disposed on the other side of said wheel and in the plane thereof, brake shoes mounted on said truck levers for application to said wheel, a pull rod connecting said dead and live truck levers below the wheel center, a cylinder lever pivotally mounted adjacent one end to said truck and extending outwardly and operatively connected to the piston of said cylinder, a fulcrum lever pivoted adjacent one end thereof to said truck outwardly of said wheel and extending inwardly and operatively connected to said live truck lever, and a pull rod pivotally connected to said cylinder lever and fulcrum lever intermediate the ends thereof.

13. In brake rigging, the combination of a truck frame, a wheel, a dead truck lever at one side of said wheel, a live truck lever at the opposite side of said wheel, a connection between said truck levers, a fulcrum lever connected to one of said truck levers, a dead lever pivoted to said truck frame and connected to said fulcrum lever, and means for operating said dead lever.

14. In brake rigging, the combination of a truck frame, a wheel, a dead truck lever at one side of said wheel, a live truck lever at the opposite side of said wheel, a connection between said truck levers, dead levers connected to said truck frame and to one of said truck levers, and means for operating one of said dead levers.

15. In brake rigging, the combination of a truck frame, a wheel, a dead truck lever at one side of said wheel, a live truck lever at the opposite side of said wheel, dead levers connected to said truck frame and to one of said truck levers and means for operating one of said dead levers to thereby operate said truck levers.

16. In brake rigging, the combination of a truck frame, a wheel, a dead truck lever at one side of said wheel, a live truck lever at the opposite side of said wheel, a connection between said truck levers, a fulcrum lever connected to one of said truck levers, a dead lever pivoted to said truck frame and connected to said fulcrum lever, and means for operating said dead lever, said means including a brake cylinder, the piston of which is connected to said dead lever.

17. In brake rigging, the combination of a truck frame, a wheel, a dead truck lever at one side of said wheel, a live truck lever at the opposite side of said wheel, a connection between said truck levers, a fulcrum lever connected to one of said truck levers, a dead lever pivoted to said truck frame and connected to said fulcrum lever, and means for operating said dead lever, said means including a brake cylinder, the piston of which is connected to one end of said dead lever.

18. In brake rigging, the combination of a truck frame, a wheel, a dead truck lever at one side of said wheel, a live truck lever at the opposite side of said wheel, a connection between said truck levers, dead levers connected to said truck frame and to one of said truck levers, and means for operating one of said dead levers, said means including a brake cylinder, the piston of which is connected thereto.

19. In brake rigging, the combination of a truck frame, a wheel, a dead truck lever at one side of said wheel, a live truck lever at the opposite side of said wheel, a connection between said truck levers, dead levers connected to said truck frame and to one of said truck levers, and means for operating one of said dead levers, said means including a brake cylinder, the piston of which is connected thereto adjacent one end thereof.

20. In brake rigging, the combination of a truck frame, a wheel, a dead truck lever at one side of said wheel, a live truck lever at the opposite side of said wheel, dead levers connected to said truck frame and to one of said truck levers, and means for operating one of said dead levers to thereby operate said truck levers, said means including a brake cylinder, the piston of which is connected thereto.

21. In brake rigging, the combination of a truck frame, a wheel, a dead truck lever at one side of said wheel, a live truck lever at the opposite side of said wheel, dead levers connected to said truck frame and to one of said truck levers, and means for operating one of said dead levers to thereby operate said truck levers, said means including a brake cylinder, the piston of which is connected thereto adjacent one end thereof.

22. In brake rigging, the combination of a truck frame, a wheel, truck levers disposed on opposite sides of said wheel and aligned therewith, a connection between said truck levers, a fulcrum lever connected to one of said truck levers, a dead lever pivoted to said truck frame and connected to said fulcrum lever, and means for operating said dead lever.

23. In brake rigging, the combination of a truck frame, a wheel, truck levers disposed on opposite sides of said wheel and aligned therewith, a fulcrum lever connected to one of said truck levers, a dead lever pivoted to said truck frame and connected to said fulcrum lever, and means for operating said dead lever to thereby operate said truck lever.

24. In brake rigging, the combination of a truck frame, a wheel, truck levers disposed on opposite sides of said wheel and aligned therewith, a connection between said truck levers, a fulcrum lever connected to one of said truck levers, a dead lever pivoted to said truck frame and connected to said fulcrum lever, and means for operating said dead lever, said means including a brake cylinder the piston of which is connected to said dead lever.

25. In brake rigging, the combination of a truck frame, a wheel, truck levers disposed on opposite sides of said wheel and aligned therewith, a fulcrum lever connected to one of said truck levers, a dead lever pivoted to said truck frame and connected to said fulcrum lever, and means for operating said dead lever, said means including a brake cylinder the piston of which is connected to said dead lever to thereby operate said truck lever.

26. In a truck brake equipment, the combination with a truck frame having side members, of a system of operatively connected brake elements including a live brake lever carried by the truck frame, the end of the live lever to which power is applied to effect the operation of said system to apply the brakes being movable in a direction toward the adjacent end of the truck frame, a brake cylinder device secured to one of said side members for operating said live lever, a push rod included in said brake cylinder device movable in the same direction as said end of the live lever to apply the brakes, and a plurality of horizontally disposed operatively connected levers pivotally mounted on the truck frame and operatively connecting said push rod to said end of the live lever.

27. In a truck brake equipment, the combination with a truck frame having side members, of a system of operatively connected brake elements including a live brake lever carried by the truck frame, the end of the live lever to which power is applied to effect the operation of said system to apply the brakes being movable in a direction toward the adjacent end of the truck frame, a brake cylinder device secured to one of said side members for operating said live lever, a push rod included in said brake cylinder device movable in the same direction as said end of the live lever to apply the brakes, and a plurality of horizontally disposed operatively connected levers pivotally mounted on said end of the truck frame and operatively connecting said push rod to said end of the live lever.

28. In a brake rigging, the combination of a truck frame, a wheel associated therewith, live and dead truck levers pivotally supported on said frame and arranged on opposite sides of said wheels, a pull rod connecting said live and dead truck levers, a dead fulcrum lever pivoted at one end to said frame and connected at its other end to said live lever, a dead lever pivotally mounted at one end on said frame, operating means connected to the other end of said last named lever, and a pull rod connecting said last named lever and said fulcrum lever.

29. In a brake rigging, the combination of a truck frame, a wheel, a dead truck lever at one side of said wheel, a live truck lever at the opposite side of said wheel, a connection between said truck levers, a fulcrum lever connected to one of said truck levers, a dead lever pivoted to said truck frame and connected to said fulcrum lever, and means for operating said dead lever to thereby operate said truck levers, said means including a brake cylinder, the piston of which is connected to said dead lever.

30. In a brake rigging, the combination of a truck frame, a wheel, a dead truck lever at one side of said wheel, a live truck lever at the opposite side of said wheel, a connection between said truck levers, a fulcrum lever connected to one of said truck levers, a dead lever pivoted to said truck frame and connected to said fulcrum lever, and means for operating said dead lever to thereby operate said truck levers, said means including a brake cylinder, the piston of which is connected to one end of said dead lever.

31. In a brake rigging, the combination of a truck frame, a wheel associated therewith, live and dead truck levers pivotally supported on said frame and arranged on opposite sides of said wheels, a pull rod connecting said live and dead truck levers, a dead fulcrum lever pivoted at one end to said frame and connected at its other end to said live lever, said fulcrum lever being slidably supported on said frame, a dead lever pivotally mounted at one end on said frame, operating means connected to the other end of said last named lever, and a pull rod connecting said last named lever and said fulcrum lever.

32. In a brake rigging, the combination of a truck frame, a wheel associated therewith, live and dead truck levers pivotally supported on said frame and arranged on opposite sides of said wheel, a pull rod connecting said live and dead truck levers, a horizontally disposed dead fulcrum lever pivoted at one end to said frame and connected at its other end to said live truck lever, a horizontally disposed dead lever pivotally mounted at one end to said frame and connected to said fulcrum lever, and operating means connected to the other end of said last named lever.

33. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a brake cylinder mounted on said frame outwardly thereof and facing the end of said frame, the piston of said cylinder being connected to the other end of said cylinder lever and a pull rod connecting said cylinder lever to said fulcrum lever.

34. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a brake cylinder mounted on said frame and facing the end of said frame, the piston of said cylinder being connected to the other end of said cylinder lever and a pull rod connecting said cylinder lever to said fulcrum lever.

35. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a cylinder mounted on said frame adjacent one end thereof, the piston thereof being connected to the other end of said cylinder lever, and a pull rod connecting said cylinder lever to said fulcrum lever.

36. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a horizontally arranged brake cylinder mounted on said frame outwardly thereof and facing the end of said frame, the piston of said cylinder being connected to the other end of said cylinder lever and a pull rod connecting said cylinder lever to said fulcrum lever.

37. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a horizontally arranged brake cylinder mounted on said frame and facing the end of said frame, the piston of said cylinder being connected to the other end of said cylinder lever and a pull rod connecting said cylinder lever to said fulcrum lever.

38. In a brake rigging, the combination of a truck frame, a wheel associated therewith, live and dead truck levers pivotally supported on said frame and arranged on opposite sides of said wheel, a pull rod connecting said live and dead truck levers, a dead fulcrum lever pivoted at one end to said frame and connected at its other end to said live lever, a dead cylinder lever pivotally mounted at one end on said frame adjacent the end thereof, a horizontally arranged cylinder mounted on said frame adjacent one end thereof, the piston thereof being connected to the other end of said cylinder lever and a pull rod connecting said cylinder lever to said fulcrum lever.

39. In a brake rigging, the combination of a truck frame, a wheel associated therewith, truck levers supported on said frame on each side of said wheel, one of said levers being a dead truck lever, a pull rod connecting said truck levers, a dead fulcrum lever pivoted at its outer end to said frame and its other end to one of said truck levers, a dead lever pivotally mounted at its inner end on said frame, a pull rod connecting said last named lever and said fulcrum lever, and operating means connected to the outer end of said dead lever.

40. In a brake rigging, the combination of a truck frame, a wheel associated therewith, truck levers supported on said frame on each side of said wheel, one of said levers being a dead truck lever, a pull rod connecting said truck levers, a dead fulcrum lever pivoted at its outer end to said frame and its other end to one of said truck levers, a dead lever pivotally mounted at its inner end on said frame, a pull rod connecting said last named lever and said fulcrum lever, and operating means including a cylinder, the piston of which is connected to the outer end of said dead lever.

41. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at its outer end to said frame and connected at its inner end to brake rigging, and a pull rod connecting said cylinder and fulcrum levers.

42. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at its outer end to said frame and connected at its inner end to brake rigging, and a rod connected to said cylinder and fulcrum levers intermediate the ends thereof.

43. In a brake arrangement, the combination of a truck frame, a longitudinally disposed cylinder mounted thereon, a cylinder lever pivoted at its inner end to said truck frame, the outer end of said cylinder lever being connected to the piston of said cylinder, a fulcrum lever pivoted at its outer end to said frame and connected at its inner end to said brake rigging, and a rod connecting said cylinder and fulcrum levers intermediate the ends thereof.

44. In a brake arrangement, the combination of a truck frame, a horizontally disposed cylinder mounted thereon, a transversely arranged cylinder lever pivoted at its inner end to said truck frame, the outer end of said cylinder lever being connected to the piston of said cylinder, a transversely disposed fulcrum lever pivoted at its outer end to said frame and connected at its inner end to brake rigging, and a pull rod connecting said cylinder and fulcrum levers.

45. In a brake arrangement, the combination of a truck frame, a cylinder mounted adjacent and operable in the direction of one end thereof, a cylinder lever pivoted at its inner end to said truck frame adjacent one end thereof, the outer end of said cylinder lever being connected to the piston of said cylinder, a fulcrum lever pivoted at one end to said frame inwardly of said cylinder lever and connected at its other end to brake rigging, and a pull rod connecting said cylinder and fulcrum levers intermediate the ends thereof.

46. In a brake rigging, the combination of a truck frame, a wheel associated therewith, truck levers supported on said frame on each side of said wheel, one of said levers being a dead truck lever, a pull rod connecting said truck levers, a fulcrum lever pivoted at one end to the truck frame and connected at its other end to one of said truck levers, a cylinder lever pivotally mounted at one end thereof on said frame, a connection between said cylinder lever and said fulcrum lever intermediate the ends of said levers and operating means including a cylinder the piston of which is connected to one end of said cylinder lever.

47. In a brake arrangement, the combination of a truck frame, a horizontally disposed cylinder mounted thereon, a cylinder lever pivoted at its inner end to said truck frame, the outer end of said cylinder lever being connected to the piston of said cylinder, a transversely disposed fulcrum lever pivoted at its outer end to said frame and connected at its inner end to brake rigging, and a pull rod connecting said cylinder and fulcrum levers.

48. In a brake arrangement, the combination of a truck frame, a horizontally disposed cylinder mounted thereon, a transversely arranged cylinder lever pivoted at its inner end to said truck frame, the outer end of said cylinder lever being connected to the piston of said cylinder, a fulcrum lever pivoted at its outer end to said frame and connected at its inner end to brake rigging, and a pull rod connecting said cylinder and fulcrum levers.

49. In a brake rigging, the combination with a railway car truck comprising a truck frame and a plurality of wheels, of a clasp brake rigging associated with each wheel comprising operatively connected truck levers located on the respective sides of a wheel, a dead lever pivotally mounted on the truck frame and operatively connected to one of said truck levers, a cylinder lever pivotally mounted on the truck frame and operatively connected with said dead lever, and a brake cylinder for actuating said cylinder lever.

50. In a brake rigging, the combination with a railway car truck comprising a truck frame and a plurality of wheels, of a clasp brake rigging associated with each wheel comprising operatively connected truck levers located on the respective sides of a wheel and substantially in the plane thereof, a dead lever pivotally mounted on the truck frame and operatively connected to one of said truck levers, a cylinder lever pivotally mounted on the truck frame and operatively connected with said dead lever, and a brake cylinder for actuating said cylinder lever.

RAY G. AURIEN.